United States Patent [19]

Wilson

[11] B 3,999,155

[45] Dec. 21, 1976

[54] CIRCUIT INTERRUPTER INCLUDING A CURRENT-LIMITING REACTOR

[75] Inventor: James C. Wilson, Beaver, Pa.

[73] Assignee: Westinghouse Electric Corporation, Pittsburgh, Pa.

[22] Filed: Sept. 25, 1974

[21] Appl. No.: 509,165

[44] Published under the second Trial Voluntary Protest Program on March 2, 1976 as document No. B 509,165.

[52] U.S. Cl. .................................. 335/7; 317/11 C
[51] Int. Cl.² ........................................ H01H 83/00
[58] Field of Search ............... 335/6, 7, 8, 16, 18, 335/41, 147, 195, 201; 317/11 C, 20; 337/186

[56] References Cited

UNITED STATES PATENTS

| 3,152,282 | 10/1964 | Baltensperger et al. | 317/11 C |
|---|---|---|---|
| 3,593,251 | 7/1971 | Wilson | 337/186 |
| 3,703,664 | 11/1972 | Cronin | 317/20 |
| 3,815,059 | 6/1974 | Spoelman | 335/16 |
| 3,836,819 | 9/1974 | Clausing | 317/11 C |

Primary Examiner—G. Harris
Attorney, Agent, or Firm—R. E. Converse, Jr.

[57] ABSTRACT

A circuit interrupter including a multipole circuit breaker and a multipole current-limiting reactor device. The multipole current-limiting reactor device includes an insulating housing forming a plurality of compartments, each compartment having a double-wound solenoid connected in series with one pole of the circuit breaker. The current-limiting reactor device limits the current through the circuit interrupter during overcurrent conditions to a value which can be safely interrupted by the circuit breaker.

8 Claims, 6 Drawing Figures

3,999,155

CIRCUIT INTERRUPTER INCLUDING A CURRENT-LIMITING REACTOR

BACKGROUND OF THE INVENTION

1. Field of the Invention

The invention relates to circuit interrupters and more particularly to circuit interrupters including means for limiting short circuit current therethrough.

2. Description of the Prior Art

Circuit interrupters are widely used in industry to protect electrical apparatus from overcurrent conditions. They are designed to continuously carry current at a level necessary for normal operation of the apparatus being protected. At currents above this level, the circuit breaker will interrupt the flow of current through the electrical apparatus, thereby preventing damage which can result from such overcurrent operation. The maximum level of current which the circuit interrupter will carry without interrupting is known as the maximum continuous current. Beyond this level, interruption will occur within an interval determined by the amount by which the current exceeds the maximum continuous rating. However, there is a maximum interruptable current beyond which the circuit interrupter will be damaged and will not successfully interrupt the current flow. Some circuits are capable of supplying as much as 100,000 amperes or more. To provide a breaker alone having a maximum interruptable current of this order would require a breaker with massive components having a very high cost. It is, therefore, desirable to provide the circuit interrupter with means in addition to the circuit breaker which will operate upon the occurrence of heavy short circuit currents having values above the maximum interruptable current rating of the breaker along, thereby extending the maximum interruptable current of the entire circuit interrupter.

One way of providing the current limiting action is to connect a conventional fuse device in series circuit relationship with the circuit breaker. Such a fuse device is described in U.S. Pat. No. 3,593,251 issued to the applicant. A current interrupter including such as fuse device is described in U.S. Pat. No. 3,638,157 issued to Zelco J. Kruzic. Both of the above mentioned patents are assigned to the assignee of the instant application. Conventional fuse devices require replacement after each current-limiting interruption.

Re-healable fuses do not require replacement after each interruption. The life of such devices is finite, however, and they, too, eventually require replacement.

Another method for limiting current through a circuit interrupter under heavy short circuit current conditions is described in U.S. Pat. No. 3,136,921 issued to H. D. Dorfman et al. In that device, an additional arc is introduced in series circuit relationship with the circuit breaker contacts by an electromagnet also in series circuit relationship with the contacts. Another device in which current limiting is accomplished by an arc induced electro-dynamically is described in U.S. Pat. No. 3,555,471 issued to J. F. Mitskevich et al. Pat. No. 3,745,369 issued to Kiyoshi Yamagata also described a device employing electrodynamic means for current limiting in a circuit interrupter. Such devices require periodic cleaning, maintenance and eventual replacement.

It would be desirable to provide a circuit interrupter including self-restoring current-limiting means of simple low-cost construction. It would also be desirable to provide current-limiting means employing no moving parts which does not require maintenance or replacement following current-limiting circuit interruption as is required in current-limiting fuse devices.

SUMMARY OF THE INVENTION

The invention provides an improved current limiting circuit interrupter comprising a circuit breaker and current-limiting reactor means connected in series circuit relationship. The current-limiting reactor means limits the peak let-through current to a value below the maximum interruptable current rating of the circuit breaker alone. The current-limiting reactor means comprises an insulating solenoid housing and solenoid means supported within the housing. The solenoid housing comprises a front housing part having a plurality of compartments therein and a back part housing secured to the front housing part. A separate solenoid means is mounted in each of the compartments of the front housing part and each compartment is filled with a thermally conductive and electrically insulating material. Each of the separate solenoid means comprises a pair of terminals and a solenoid connected between the terminals. Each of the terminals comprises an internal leg connected to the solenoid means and an external leg that extends generally normal to the internal leg. Each terminal is adapted to receive bolt-on type connections with a conductor. The external legs of the spaced terminals extend out through slots in the opposite end of the front housing part, and the back housing part comprises a generally flat front surface that closes off the compartment opening from the front housing part to complete the housing assembly. A resilient gasket is provided between the front and back housing parts. The front housing is shaped to provide a plurality of cavities at one end thereof for receiving solderless terminal connectors that are connected to the external terminal legs at one end of the solenoid means to enable connection of the circuit interrupter in an electric circuit. Each of the solenoid means is a unitary preassembled device. During the assembly operation, each of the solenoid means is dropped into the associated compartment of the front housing part. A gasket is then positioned at the opening end of the front housing part. Thereafter, the compartments of the front housing part are filled with thermally conductive and electrically insulating material such as epoxy and the back housing part secured in position to complete the assembly.

BRIEF DESCRIPTION OF THE DRAWINGS

FIG. 6 is an electrical schematic diagram of the three-pole circuit interrupter seen in FIG. 1.

DESCRIPTION OF THE PREFERRED EMBODIMENT

Figure 1:
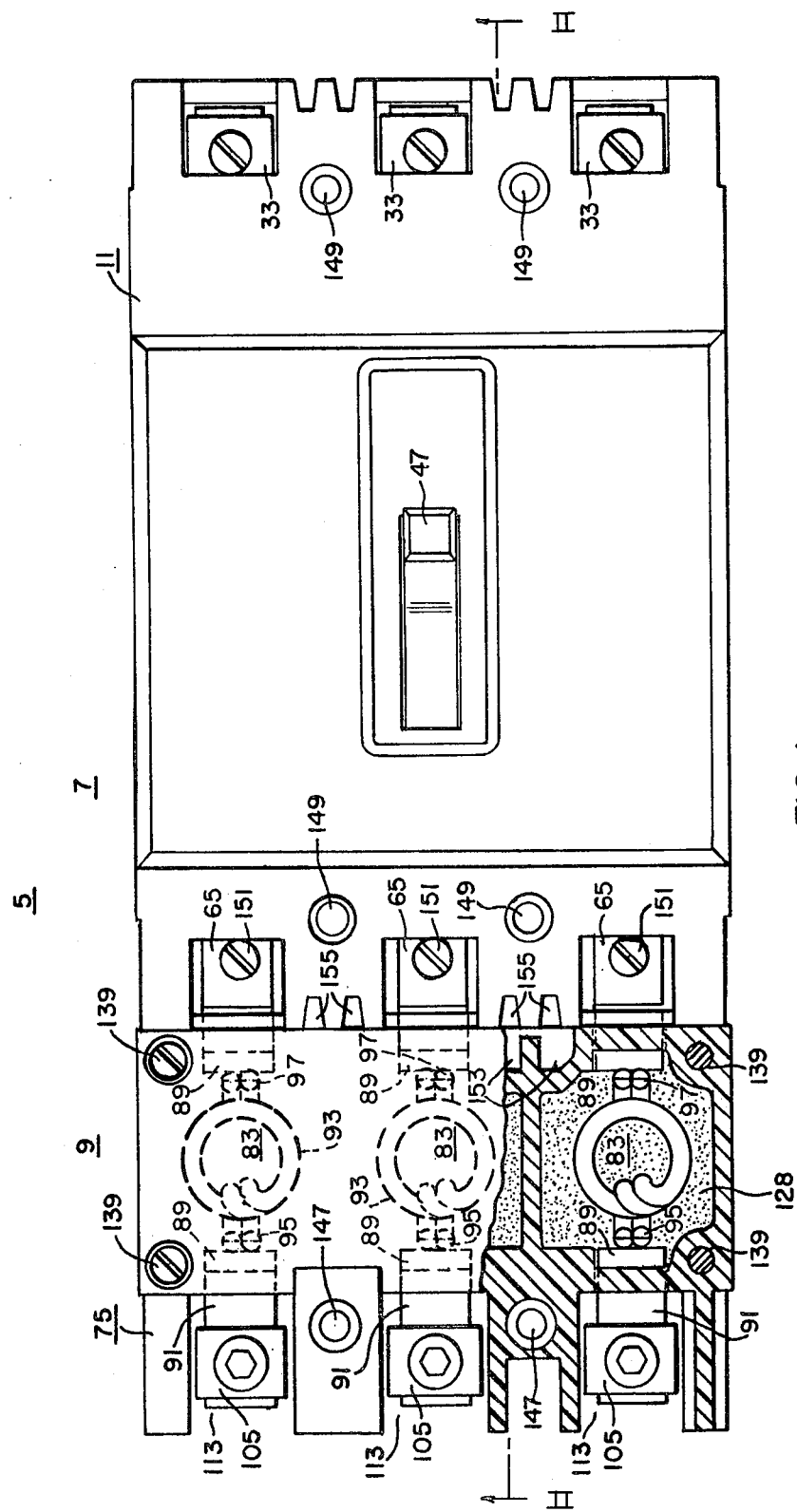
FIG. 1 is a plan view, partially cut away, of a circuit interrupter constructed in accordance with the principles of this invention.
Figure 2:
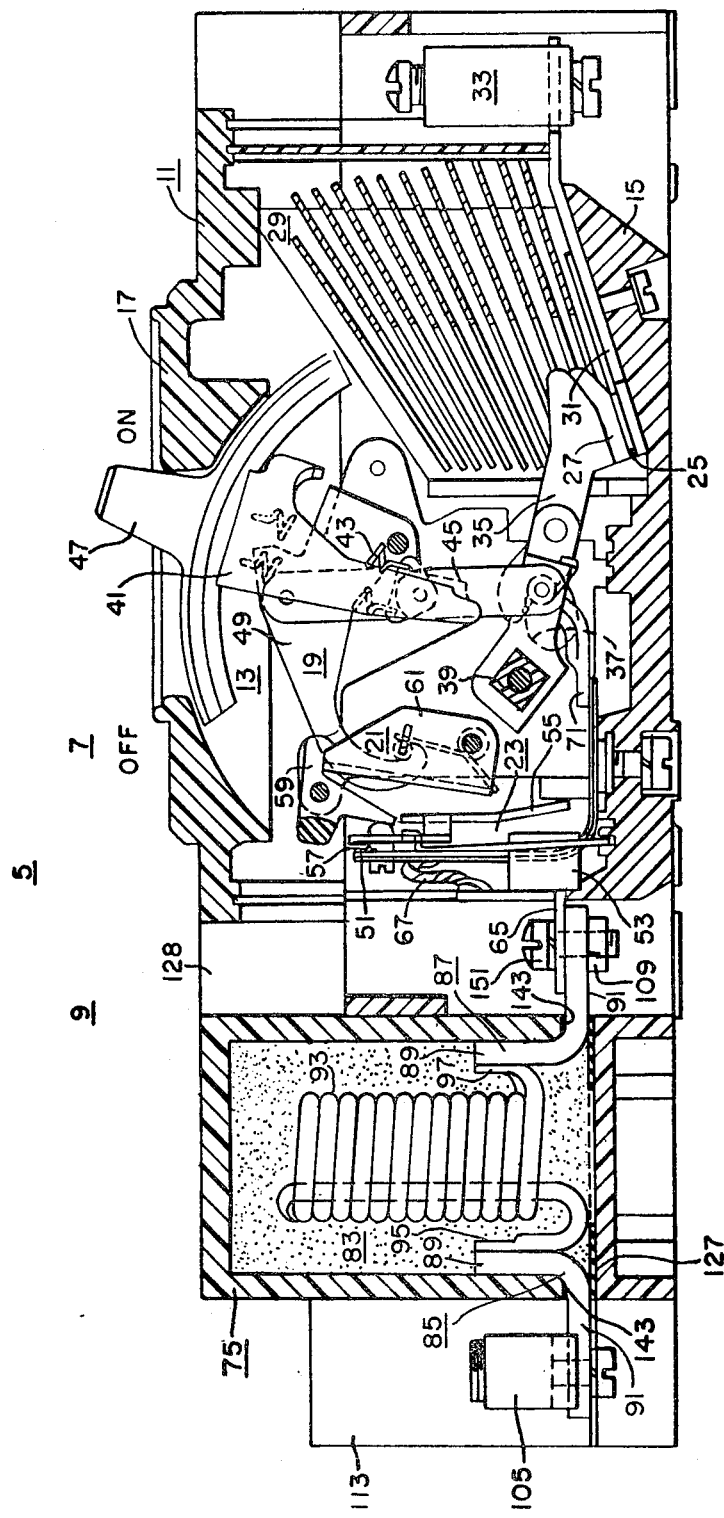
FIG. 2 is a sectional view taken generally along the line II—II of FIG. 1.

Referring to the drawings, there is shown in FIGS. 1 and 2, a three-pole circuit interrupter 5 comprising a three-pole circuit breaker 7 and a three-pole current-limiting reactor device 9 connected to the circuit breaker.

The circuit breaker 7 is of the type that is more specifically described in U.S. Pat. No. 3,462,716 issued Aug. 19, 1969 to Nick Yorgin et al. Thus, only a brief description of the circuit breaker 7 is given herein.

Referring to FIGS. 1 and 2, the circuit breaker 7 is a three-pole circuit breaker comprising an insulating housing 11 and a circuit breaker mechanism 13 supported in the housing 11. The housing 11 comprises a back insulating housing base 15 and a front insulating housing cover 17 cooperating with the base 15 to enclose the circuit breaker mechanism. The housing 11 comprises suitable insulating barrier means separating the housing into three internal compartments for housing the three-pole units of the circuit breaker. The circuit breaker mechanism 13 comprises an operating mechanism 19, a latch mechanism 21, and a thermal- and magnetic trip device 23. A stationary contact 25, a movable-contact 27, and an arc-extinguishing unit 29 are provided for each pole unit of the circuit breaker. The stationary contact 25 for each pole unit is fixedly mounted on the inner end of a conducting strip 31 that extends outward to an external cavity where a well-known type of solderless terminal connector 33 is secured to the end of the conductor 31. The movable contact 27 for each pole unit is mounted on a contact arm 35 that is mounted on a switch arm 37 that is fixedly secured to an insulating tie bar 39. The switch arms 37 for the three-pole units are secured to the common tie bar 39, and the tie bar 39 is mounted for pivotal movement between open and closed positions.

The operating mechanism 19 comprises an inverted generally U-shaped operating lever 41, an overcenter spring means 43 and a toggle 45. An insulating handle 47 is connected to the lever 41, with the handle 47 protruding through a suitable opening in the front of the breaker housing. The lever 41 is mounted for pivotal movement about the inner ends of the legs thereof. The toggle 45 is connected to the switch arm 37 of the center pole unit.

The contacts are manually opened by movement of the handle 47 from the "on" position to the "off" position. The movement moves the line of action of the overcenter springs 43 to cause collapse of the toggle 45 to thereby cause opening movement of the switch arm 37 in the center pole unit. Since all three switch arms are connected to the bar 39 for simultaneous movement, this movement simultaneously moves the three switch arms 37 to the open position. The contacts are manually closed by reverse movement of the handle 47 from the "off" position to the "on" position, which movement moves the line of action of the overcenter spring 43 to erect the toggle 45 to thereby move the centerpole switch arm 37, and therefore all of the switch arms 37, to the closed position seen in FIG. 2.

The operating mechanism 19 comprises a trip member 49 that is latched by means of the latch device 21. In each pole unit, the trip device 23 comprises a bimetal 51, a magnetic yoke 53, and a magnetic armature 55. Upon the occurrence of an overload above a first predetermined value, the bimetal 51 is heated and flexes to the right whereupon an adjusting screw 57 engages a common trip bar 59 to move the trip bar 59 to a releasing position to release a latch 61 which then releases the trip member 49. Upon release of the trip member 49, the springs 43 operate to move the trip member 49 to thereby effect collapse of the toggle 45 and opening movement of the switch arms 37 in a well known manner. Following a thermal tripping operation, the circuit breaker is reset and relatched by movement of the handle 47 to the full "off" position to thereby move the trip member 49 back to the latched position seen in FIG. 2. Upon the occurrence of an overload above a second predetermined value higher than the first predetermined value, the armature 55 is instantaneously attracted to the yoke 53 to thereby move the trip bar 59 to the tripping position to effect tripping operation in the same manner as was hereinbefore described with regard to the thermal tripping operation.

Referring to FIG. 2, the circuit through each pole unit extends from a generally L-shaped conductor 65, through a flexible conductor 67, the bimetal 51, a flexible conductor 71, the contact arm 35, the movable contact 27, the stationary contact 25, the conductor 31, to the solderless terminal connector 33. As can be seen in FIG. 2, in each pole unit there is a pair of cavities at the opposite ends of the housing. The connector 33 is supported in the cavity on the right, and the conductor 65 extends into the cavity on the left. In each pole unit the conductor 65 is positioned to receive connection of one of the terminals of the current-limiting reactor device in a manner to be hereinafter more specifically described.

Figure 3:
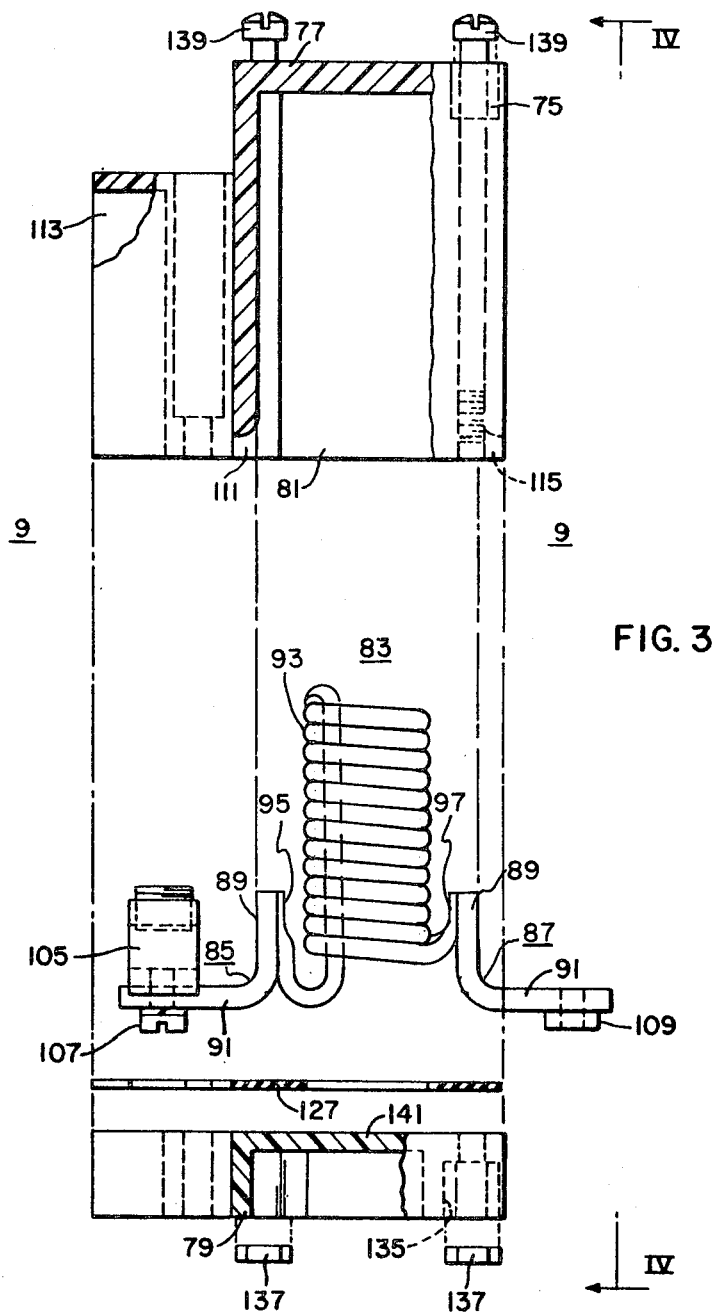
FIG. 3 is an exploded side view, with parts cut away, of the current-limiting reactor device seen in FIGS. 1 and 2.
Figure 4:
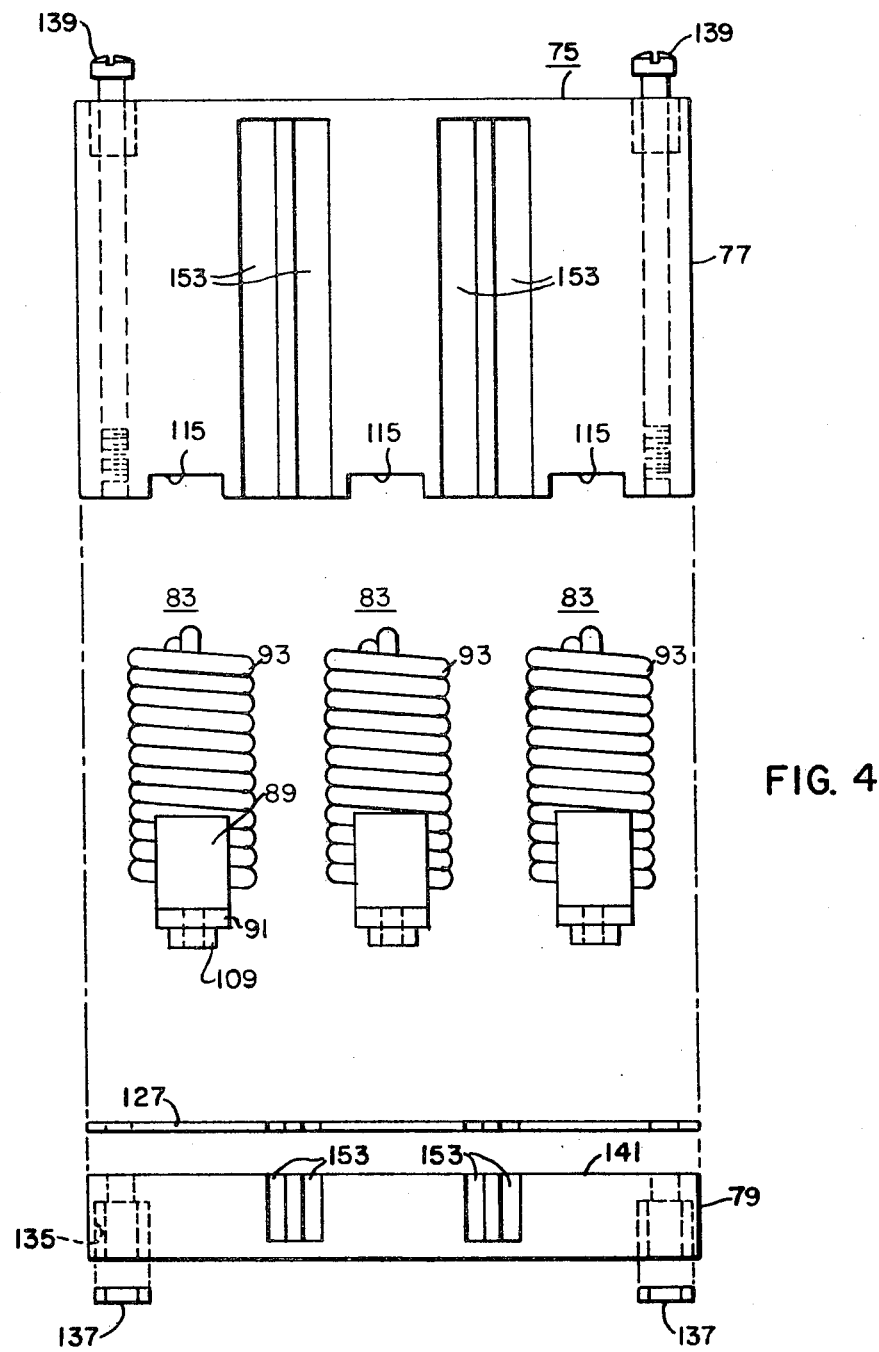
FIG. 4 is an exploded end view of the parts of FIG. 3 looking in the direction of the IV—IV arrows of FIG. 3.

The current limiting reactor device 9 comprises an insulated housing indicated generally at 75. The housing 75 comprises an insulating front housing part 77 and an insulating back housing part 79 (FIGS. 3 and 4). The front housing part 77 is molded with insulating barrier means to form three adjacent compartments 81. A separate solenoid means indicated generally at 83 is supported in each of the compartments 81.

Each of the solenoid means 83 (FIGS. 3 and 4) comprises a pair of terminals 85 and 87. Each of the terminals 85, 87 comprises an internal generally planar leg 89 that is bent over at the lower end thereof to provide an external generally planar leg 91 that extends generally normal to the plane of the associated leg 89. A double-wound solenoid or coil 93 includes two copper windings 94 and 96 connected in parallel between the terminals 85 and 87 by soldering two pairs of leads 95 and 97 to the internal legs 89. The external leg 91 (on the left as seen in FIG. 3) is provided with an aperture therein, and a solderless terminal connector 105 is connected to the leg 91 by means of a screw 107 that extends through the opening in the leg 91 and is threaded into a portion of the solderless terminal connector 105. The leg 91 seen on the right in FIG. 3 is provided with an aperture therein, and a member 109, having a tapped hole therein aligned with the aperture in the leg 91, is fixedly secured to the undersurface of the leg 91 to receive a screw or bolt in a manner to be hereinafter described.

Figure 5:
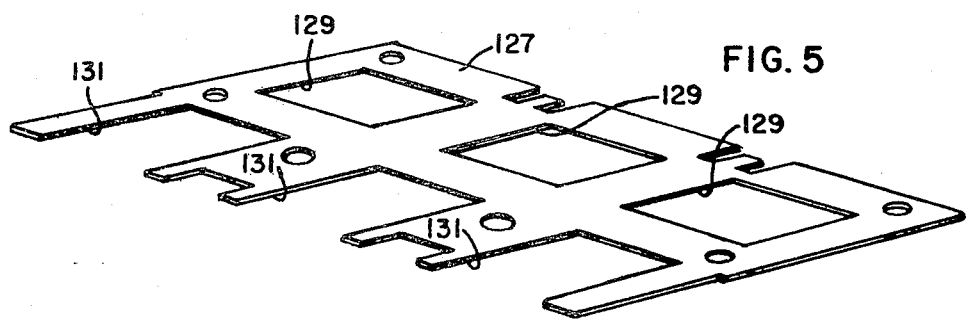
FIG. 5 is a perspective view of the gasket seen in FIGS. 2 through 4.

As will be understood with reference to FIG. 3, there is a slot 111 at one end of each of the compartments 81 of the front housing part 77, and a cavity 113 opposite each slot 111. There is a slot 115 in the front housing part 77 at the opposite end of each of the compartments 81. When it is desired to assemble the current-limiting reactor device 9, the front housing part 77 is turned over. Each of the solenoid means 83 is then dropped downward into the associated cavity 81. Inward movement of each of the solenoid means 83 is limited when the front portions of the external legs 91 engage the insulating surfaces at the front of the slots 111 and 115. During the movement of each of the solenoid means 83 into position, the associated solderless terminal connector 105 moves into the associated cavity 113. After the three solenoid means 83 are properly positioned in the associated cavities of the front housing part 77, a resilient gasket 127 is placed on the housing part 77 and a potting compound is poured into the compartments 81. The potting compound flows into the compartments 81 to fill the voids in the compartments. During assembly the inherent stiffness of the wire from which the solenoid 93 is wound maintains proper positioning of the solenoid 93. Thereafter, the potting compound insures that the solenoid 93 will be firmly held in position. The potting compound is a special epoxy material which is a thermal conductor and an electrical insulator. As can be seen in FIG. 5, the gasket 127 is provided with openings 129 that align with the compartments 81 and openings 131 that align with the cavities 113. With the current limiting reactor means 83, potting compound 128, and gasket 127 in position, the lower housing part 79 is placed into position against the gasket 127, and the housing parts 77, 79 are then secured together. There are four pockets 135 (FIG. 3) in the lower part of the housing part 79 shaped to key with four nuts 137. The nuts 137 are positioned in the pockets 135 and four elongated bolts 139 are placed through suitable openings in the front housing part 77 and back housing part 79. The bolts 139 are threaded into the nuts 137 to draw the housing parts 77, 79 together, sandwiching the gasket 127 therebetween to fixedly secure the housing parts 77, 79 together. As can be understood with reference to FIGS. 3 and 4, the front surface 141 of the housing part 79 is a flat planar surface. When the housing parts 77, 79 are secured together, the current limiting reactor device 9 is turned over to the upright positions seen in FIG. 2. In the upright position, the lower surface of the legs 91 of each of the three solenoid means 83 rest on the gasket 127 that is positioned on the flat front surface 141 of the lower housing part 79, to thereby support the three solenoid means 83 on the front housing part 79. Thereafter, the small space between the front portions and sides of the legs 91 and the peripheries of the openings of the slots 111, 115 is filled by means of an insulating cement 143 that is painted into these openings. The cement 143 is a type of cement that may be painted into position to take a firm set without actually getting hard so that if relative movement of the solenoid means 83 occurs, the cement 143 will not crack.

As can be understood with reference to FIGS. 1 through 3, there are three pole-unit compartments in the insulating housing 75 with the back housing part 79 forming the back walls of the three compartments and the hood type front housing part 77 forming the side walls, end walls and front walls of the three compartments.

When the current-limiting reactor device 9 is completely assembled, it is removably connected to the circuit breaker 7 by means of a plurality of screws 151. When it is desired to connect the current-limiting reactor device 9, it is moved adjacent to the one end of the circuit breaker 7 with each of the external legs 91 of the terminals 87 extending into the associated cavity of the housing 11 of the circuit breaker below the associated terminal conductor 65. An aperture in each leg 91 is aligned with an aperture in the associated conductor 65. Thereafter, a screw 151 may be passed through the aligned apertures in the members 65, 91 and threaded into the member 109 that is secured to the associated leg 91. Thus, the screws 151 fixedly connect terminals 87 to the terminals 65. As can be seen in FIGS. 1 and 4, the insulating housing 75 of the current-limiting reactor device 9 is provided with a pair of slots 153 between adjacent pole units. The insulating housing 11 of the circuit breaker 7 is provided with a pair of slots 155 (FIG. 1) between adjacent pole units. The slots 153, 155 provide electrical clearance between adjacent terminals 87 of the three adjacent pole units. As can be understood with reference to FIGS. 1 through 3 each of the cavities 113 is separated by suitable insulating barrier means that form the cavity to provide adequate insulation between adjacent terminals 85 and adjacent solderless terminal connectors 105.

Referring to FIGS. 1, 2, and 6 the circuit through each pole unit of the three-pole current-limiting reactor device 9 extends from the solderless terminal 105 to the terminal 85, the leads 95, the solenoid 93, and the terminal 87 to the terminal 65, to which the terminal 87 is connected by means of the screw 151. When the current through the circuit breaker 7 and current-limiting reactor device 9 is equal to or below the maximum continuous current of the combination, the impedance of the solenoid 93 is negligible. If the current then increases slowly, the circuit breaker will interrupt the circuit according to the time-tripping characteristics of the circuit breaker alone. Upon the occurrence of a sudden severe overload, such as a short circuit beyond the maximum interruptable current of the circuit breaker alone, damage to the circuit breaker 7 would occur, rendering it incapable of interrupting the current were it not for the action of the current-limiting reactor device 9. Under these conditions, characterized by a very high rate of rise of current, the inductance of the solenoid 93 causes a voltage to be generated of a polarity opposite the voltage impressed across the solenoid 93. This voltage, known as a back or reverse EMF (Electro-Motive-Force) acts to limit the peak let-through current of the current-limiting reactor device to a value much less than the available short circuit current of the supply circuit. The faster the rate of rise of overload current, the greater will be the magnitude of the back EMF, and the greater the current-limiting action.

The energy produced by an overload condition in the circuit being protected is:

$$E = R \int_o^{t_1} i^2 \, dt,$$

where $R$ is the total resistance of the circuit, $i$ is the current through the circuit, and $t_1$ is the period of time the overload exists. Thus, by limiting the current through the circuit to a lower value until the circuit breaker can interrupt the current, the total energy released is limited, thereby substantially reducing the amount of damage caused to the circuit and breaker by the overload.

A circuit interrupter employing the principles of the present invention including a circuit breaker and current-limiting reactor device each rated at 50 amperes maximum continuous current was connected to a circuit capable of supplying 100,000 amperes of short circuit current. When a short circuit was placed across the circuit interrupter, peak let-through current prior to interruption by the circuit breaker was 15,500 amps, well within the maximum interruptable current of the circuit breaker. A circuit interrupter employing the principles of the present invention will exhibit the same time-current tripping characteristics of the included circuit breaker alone; however, as can be seen by the previous example, the maximum interruptable current on the circuit interrupter including a current-limiting reactor device is much greater than that of the circuit breaker alone.

In the embodiment described, the current-limiting reactor device includes a double-wound solenoid. This provides greater surface area and greater number of turns than a solenoid of the same size and same cross-sectional area, thus increasing the heat radiating capability of the solenoid. The current-limiting capability is also increased since current-limiting is proportional to inductive reactance, and inductive reactance is proportional to the number of turns squared. In the same manner larger maximum continuous current ratings could be obtained by using solenoids of three or more windings connected in parallel circuit relationship as are the two windings in the described embodiment. Another means of increasing the maximum continuous current ratings by increasing heat radiating capability would be to include radiating fins on the exterior of the insulated housing 75.

In an alternative embodiment stranded wire is wound upon a coil form a mandrel to provide a solenoid with greater heat radiating capability and effective number of turns. The use of stranded wire increases the maximum continuous current rating and inductive reactance of the current-limiting reactor in the same manner as a multiplewinding solenoid. However, manufacturing costs of the device are also increased due to the fact that stranded wire, unlike solid wire, requires a mandrel for mechanical support.

From the foregoing description, it can be seen that the invention provides a circuit interrupter with a much higher maximum interruptable current rating than a circuit breaker alone. The device is of simple, low-cost construction and requires no maintenance or fuse-changing operations following a severe overload current interruption. The life of a circuit interrupter employing a circuit breaker and current-limiting reactor device as described is equal to the life of the circuit breaker alone.

I claim:

1. A circuit interrupter having a peak let-through current under sudden severe overcurrent conditions, comprising a circuit breaker having separable contacts, and current-limiting reactor means connected in series circuit relationship with said circuit breaker; said current-limiting reactor means comprising an insulating housing having a compartment formed therein, a coil of conductive material supported within said housing and electrically connected in series circuit relationship with contacts of said circuit breaker, and electrically insulating thermally conducting filler material surrounding said coil and occupying the volume of said compartment; said current-limiting reactor means being connected to said circuit breaker during both normal and overcurrent conditions and limiting the peak let-through current during overcurrent conditions to a value which can be safely interrupted by said circuit breaker.

2. A circuit interrupter having a peak let-through current under sudden severe overcurrent conditions, comprising a circuit breaker having separable contacts, and current-limiting reactor means connected in series circuit relationship with said circuit breaker, said current-limiting reactor means comprising a plurality of conducting members of normal electrical conductivity connected in parallel circuit relationship and wound into a coil, said current-limiting reactor means being connected to said circuit breaker during both normal and overcurrent conditions and limiting the peak let-through current during overcurrent conditions to a value which can be safely interrupted by said circuit breaker.

3. A circuit interrupter as recited in claim 2 wherein said current-limiting reactor means comprises an insulating housing forming a compartment therein, said coil being supported within said compartment, and electrically insulating and thermally conducting filler material surrounding said coil and occupying the volume within said compartment.

4. A circuit interrupter as recited in claim 3 wherein said housing comprises opening means at opposite ends of said compartment and said coil comprises a pair of terminals, one of said terminals being connected to each end of said parallel-connected normally conductive members and extending through one of said opening means.

5. A current-limiting reactor device comprising an insulating housing adapted for mounting in association with a circuit breaker and having a compartment formed therein, solenoid means supported within said compartment and comprising a plurality of conductive members of normal electrical conductivity, said conductive members being connected in parallel circuit relationship and wound into a coil adapted for series circuit connection to the contacts of an associated circuit breaker, said reactor device limiting current under short circuit conditions to a value below that which would cause damage to the associated circuit breaker.

6. A current-limiting reactor device comprising an insulating housing adapted for mounting in association with a circuit breaker and having a compartment formed therein, solenoid means supported within said compartment and comprising normally conductive means wound into a coil, and filler material surrounding said solenoid means and occupying the interior volume of said compartment, said filler material being electrically insulating and thermally conducting, said reactor device limiting current under short circuit conditions to a value below that which would cause damage to the circuit breaker.

7. A current-limiting reactor device as recited in claim 6 wherein said normally conductive means comprises a plurality of conductive members of normal electrical conductivity, said members being connected in parallel circuit relationship and adapted for series-circuit connection to the contacts of an associated circuit breaker.

8. A current-limiting reactor device as recited in claim 7 wherein said insulating housing comprises a plurality of said compartments each containing one of said solenoid means and having opening means at opposite ends of said compartments, each of said solenoid means comprising a pair of terminals extending through said opening means, said insulating housing being adapted for mounting in association with a multi-pole circuit breaker, one of said terminals of each of said solenoids being adapted for connection to a pole of said circuit breaker.

* * * * *